US011552957B2

(12) United States Patent
Rubinstein et al.

(10) Patent No.: US 11,552,957 B2
(45) Date of Patent: Jan. 10, 2023

(54) RESOURCE ACCESS CONTROL WITH DYNAMIC TAG

(71) Applicant: MICROSOFT TECHNOLOGY LICENSING, LLC, Redmond, WA (US)

(72) Inventors: Mark Ian Rubinstein, Bellevue, WA (US); Amit Akiva Apple, Redmond, WA (US); Thaddeus Scott, Kirkland, WA (US); Meng Yao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 16/460,999

(22) Filed: Jul. 2, 2019

(65) Prior Publication Data

US 2021/0006563 A1 Jan. 7, 2021

(51) Int. Cl.
*H04L 9/40* (2022.01)
*G06Q 10/10* (2012.01)

(52) U.S. Cl.
CPC ....... *H04L 63/104* (2013.01); *G06Q 10/1091* (2013.01)

(58) Field of Classification Search
CPC ... H04L 63/104; H04L 63/107; H04L 63/108; H04L 51/14; H04L 51/12; H04L 63/102;

(Continued)

(56) References Cited

U.S. PATENT DOCUMENTS 8,260,823 B2    9/2012   Farrell et al.
8,656,454 B2 *  2/2014   Gunawardena ..... G06F 16/1752
                                                726/1

(Continued)

OTHER PUBLICATIONS

Ninghui Li, J. C. Mitchell and W. H. Winsborough, "Design of a role-based trust-management framework," Proceedings 2002 IEEE Symposium on Security and Privacy, 2002, pp. 114-130, doi: 10.1109/SECPRI.2002.1004366. (Year: 2002).*

(Continued)

*Primary Examiner* — Jung W Kim
*Assistant Examiner* — Sameera Wickramasuriya
(74) *Attorney, Agent, or Firm* — NovoTechIP International PLLC

(57) ABSTRACT

In a device including a processor and a memory, the memory includes executable instructions that, when executed by the processor, cause the processor to control the device to perform functions of receiving an access control setting for granting access to an access-controlled resource and a dynamic tag characterizing a member group subject to the access control setting; accessing a data source storing member data including an attribute associated with each member, the attribute including a parameter related to a time or time period. The dynamic tag is mapped to the member data based on (1) the parameter of the attribute and (2) a time or time period associated with the dynamic tag, to identify mapped members forming the member group, wherein the mapped members identified based on a same dynamic tag vary depending on the time or time period associated with the dynamic tag, to identify the member group.

20 Claims, 11 Drawing Sheets

(58) Field of Classification Search
CPC .............. H04L 9/3247; G06Q 10/1091; G06Q 10/107; G06F 16/335; G06F 16/337
See application file for complete search history.

(56) References Cited

U.S. PATENT DOCUMENTS

| | | | | |
|---|---|---|---|---|
| 9,009,240 | B2* | 4/2015 | Milic-Frayling | H04L 51/32 709/224 |
| 2005/0132048 | A1* | 6/2005 | Kogan | G06Q 30/0603 709/225 |
| 2006/0184628 | A1* | 8/2006 | Coley | H04L 51/063 709/206 |
| 2007/0174398 | A1* | 7/2007 | Addante | H04L 67/02 709/206 |
| 2008/0109406 | A1* | 5/2008 | Krishnasamy | H04L 51/04 |
| 2008/0222513 | A1* | 9/2008 | Van Den Berge | H04N 1/00244 715/234 |
| 2009/0319623 | A1* | 12/2009 | Srinivasan | G06Q 10/107 709/206 |
| 2010/0287197 | A1 | 11/2010 | Wang et al. | |
| 2013/0007009 | A1 | 1/2013 | Caldwell et al. | |
| 2013/0254900 | A1* | 9/2013 | Sathish | H04W 4/02 726/28 |
| 2013/0268765 | A1* | 10/2013 | Kent, Jr. | H04L 9/3247 713/179 |
| 2016/0066165 | A1* | 3/2016 | Gmeiner | H04W 4/021 455/412.1 |
| 2016/0337332 | A1* | 11/2016 | Ghosh | H04L 67/18 |
| 2018/0219810 | A1* | 8/2018 | Santos Ramirez | H04L 51/14 |

OTHER PUBLICATIONS

Rahman, Farzana, Md Zakirul Alam Bhuiyan, and Sheikh Iqbal Ahamed. "A privacy preserving framework for RFID based healthcare systems." Future generation computer systems 72 (2017): 339-352. (Year: 2017).*

Rana, Juwel, Johan Kristiansson, and Kåre Synnes. "Supporting ubiquitous interaction in dynamic shared spaces through automatic group formation based on social context." 2012 International Conference on Social Informatics. IEEE, 2012. (Year: 2012).*

"International Search Report and Written Opinion Issued in PCT Application No. PCT/US2020/033333", dated Aug. 10, 2020, 11 Pages.

Bernstein, et al., "Collabio: A Game for Annotating People within Social Networks", In Proceedings of the 22nd annual ACM symposium on User Interface Software and Technology, Oct. 4, 2008, 4 Pages.

Braun, et al., "Semantic People Tagging & Ontology Maturing: An Enterprise Social Media Approach to Competence Management", In International Journal of Knowledge and Learning, vol. 8, Issue 1-2, Jan. 1, 2012, 27 Pages.

Farrell, et al., "Augmenting Employee Profiles with people-Tagging", In IBM Research Report, Nov. 3, 2006, 11 Pages.

Farrell, et al., "Fringe Contacts: People-Tagging for the Enterprise", In Proceedings of the WWW Collaborative Web Tagging Workshop, Jun. 30, 2006, 5 Pages.

Razavi, et al., "Supporting Selective Information Sharing with People-tagging", In Proceedings of the Extended Abstracts on Human Factors in Computing Systems, Apr. 5, 2008, pp. 3423-3428.

Serdyukov, et al., "Automatic People Tagging for Expertise Profiling in the Enterprise", In Proceedings of the 33rd European conference on Advances in information retrieval, Apr. 18, 2011, 12 Pages.

"TigerConnect Demo Patient Care Coordination", Retrieved from <<www.youtube.com/watch?v=bk_Rwh11VE&t=93s>>, Published on: Dec. 15, 2015, 8 Pages.

* cited by examiner

Choose who can add tags and which tags are automatically applied
Who can add tags
| Owners only ⌄ |
Automatically apply tags from company directory and other apps
Company directory
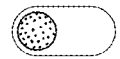 Title
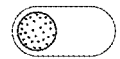 Company
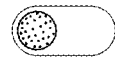 Office
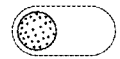 City
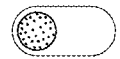 State
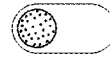 Country
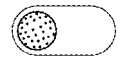 Department
Apps
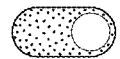 Shifts
FIG. 2

▷ Members (131)

| ∨ Name | Title | Location | Tags ⓘ |
|---|---|---|---|
| Alvin Tao | Customer Service | Bellevue /1251 | Customer Service |
| Babak Shamas | Store Manager | Bellevue /1251 | Buyer |
| Beth Davis | Sales Associate | Bellevue /1251 | Cashier Sales Associate |
| Bruno Zhao | Executive | Bellevue /1251 | Executive |
| Brian Wright | Store Manager | Bellevue /1251 | Cashier Sales Associate |
| Cassandra Dunn | Sales Associate | Bellevue /1251 | Cashier Sales Associate |
| Charlotte de Krum | Sales Associate | Bellevue /1251 | Sales Associate |
| Chris Naidoo | Cashier | Bellevue /1251 | Cashier |
| Danielle Booker | Sales Associate | Bellevue /1251 | Cashier Sales Associate |

FIG. 5

RESOURCE ACCESS CONTROL WITH DYNAMIC TAG

CROSS-REFERENCE TO RELATED APPLICATIONS

This application is related to co-pending U.S. patent application Ser. No. 16/460,991, titled "AUTOMATED MESSAGE RECIPIENT IDENTIFICATION WITH DYNAMIC TAG," filed concurrently on Jul. 2, 2019, which is incorporated hereto in its entirety.

BACKGROUND

There are numerous ways for a person to send a message to another person. For example, using a mobile phone, one can call another person, send an email or text message to another person, post a message on an online chatroom or bulletin board where other people can read and post messages, etc. Also, a large number of people use social networking services (e.g., Facebook, Instagram, LinkedIn, etc.) to communicate with others, which allow a user to tag a person to a post to ensure that the message is seen by the tagged person. While these services allow people to instantly communicate with each other, in order to send a message to someone, one is required to know to whom his or her message should be delivered to before the message is sent out. For example, there might be a situation where a research engineer located at Detroit may need to send a message to someone within the same company who can provide information about Asian marketing. Not knowing whom to contact for his inquiry, the research engineer would need to search the company directory or make phone calls to people who might be able to provide necessary information (e.g., a name, mobile number, email address, etc.), which may be time-consuming and may not always result in providing accurate information. The research engineer would not be able to send a message until he or she accurately identifies a person or a group of people in the Asian marketing department and obtains contact information that he or she can rely on to successfully send a message. Such delay caused by these activities may be crucial especially in healthcare, law enforcement, education, crisis management, etc. As such, there still remain significant areas for new and improved implementations for streamlined message target identification and delivery.

SUMMARY

In an implementation, a device includes a processor and a memory in communication with the processor. The memory includes executable instructions that, when executed by the processor, cause the processor to control the device to perform functions of receiving a first access control setting for granting access to an access-controlled resource and a first dynamic tag characterizing a first member group subject to the first access control setting; accessing a first data source storing first member data of a plurality of members, the first member data including a first attribute associated with each member, the first attribute comprising a parameter related to a time or time period; mapping the received first dynamic tag to the first member data based on (1) the parameter of the first attribute and (2) a time or time period associated with the first dynamic tag, to identify first mapped members forming the first member group, wherein the first mapped members identified based on a same dynamic tag vary depending on the time or time period associated with the first dynamic tag; and selectively granting, based on the first access control setting, a member of the first member group access to the access-controlled resource.

In another implementation, a method of operating a device includes receiving a first access control setting for granting access to an access-controlled resource and a first dynamic tag characterizing a first member group subject to the first access control setting; accessing a first data source storing first member data of a plurality of members, the first member data including a first attribute associated with each member, the first attribute comprising a parameter related to a time or time period; mapping the received first dynamic tag to the first member data based on (1) the parameter of the first attribute and (2) a time or time period associated with the first dynamic tag, to identify first mapped members forming the first member group, wherein the first mapped members identified based on a same dynamic tag vary depending on the time or time period associated with the first dynamic tag; and selectively granting, based on the first access control setting, a member of the first member group access to the access-controlled resource.

In another implementation, a non-transitory computer readable medium stores instruction that, when executed by a processor, cause a computer to perform functions of receiving a first access control setting for granting access to an access-controlled resource and a first dynamic tag characterizing a first member group subject to the first access control setting; accessing a first data source storing first member data of a plurality of members, the first member data including a first attribute associated with each member, the first attribute comprising a parameter related to a time or time period; mapping the received first dynamic tag to the first member data based on (1) the parameter of the first attribute and (2) a time or time period associated with the first dynamic tag, to identify first mapped members forming the first member group, wherein the first mapped members identified based on a same dynamic tag vary depending on the time or time period associated with the first dynamic tag; and selectively granting, based on the first access control setting, a member of the first member group access to the access-controlled resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates an implementation of a user interface for configuring settings for the automated message recipient identification system.

FIG. 5 illustrates an implementation of a user interface showing one or more tags pre-generated and associated with members.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to an automated message recipient identification system, which allows a message sender to use a tag to characterize to whom his or her message should be sent. Based on the tags, the system handles a task of identifying message recipients on behalf of the message sender. The system may be connected to various data source devices that can provide various types of data sets regarding members. The data source devices may be operating to collect, maintain and update different types of member data and may provide the most accurate and up-to-date member data. By leveraging the detailed, accurate and up-to-date member data available from the various data sources, the system may allow the message sender to characterize, using one or more tags, a recipient or recipient group for his or her message in a high level of detail. Based on the tags, the system may take care of the burden of identifying the recipient or recipient group for the message on behalf of the message sender by processing the various data sets to identify the members who are relevant to the tags. Hence, a message sender can send a message immediately without needing to search or ask around about to which people he or she needs to send the message and how to contact those people. Since a message sender can send a message even if he or she does not know the recipient identity or contact information, the system may provide a technical advantage of reducing or eliminating a delay in sending a message caused by searching or asking around about the people. The system may subscribe various data sources in a flexible manner. For example, when a new data source becomes available, the system may connect to the new source to start subscribing to a new data set. When a data source cannot provide accurate or up-to-date message recipients, the system may stop subscribing to the data source. As such, the system may identify a message recipient or recipient group in a more accurate manner, which may also reduce or eliminate a likelihood of a message being sent to an unintended member or member group.

Figure 1:
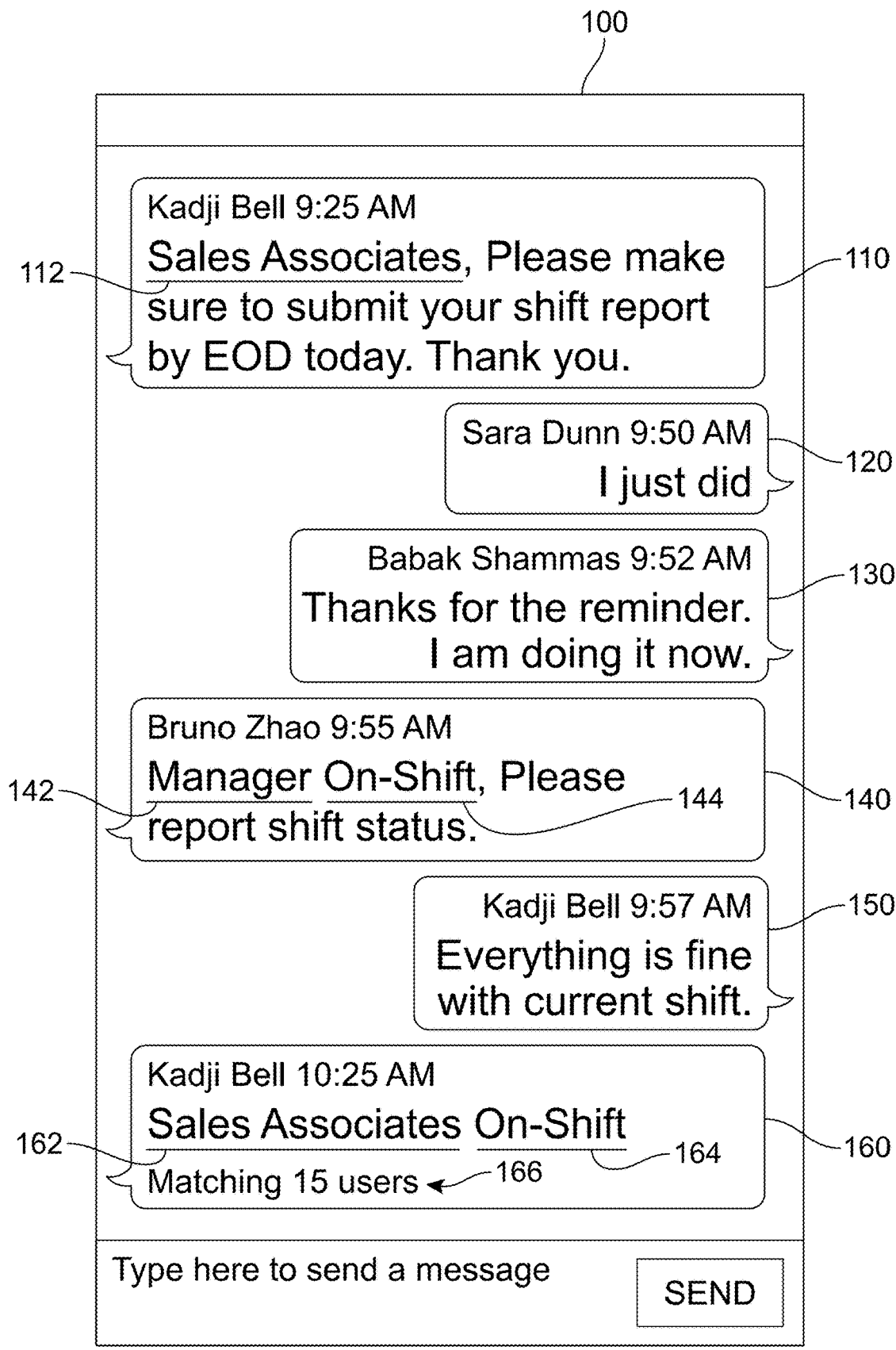
FIG. 1 illustrates an implementation of a user interface for a messaging app in communication with an automated message recipient identification system.

FIG. 1 illustrates an implementation of a user interface 100 for a messaging application (e.g., a mobile messaging app) operating on a user device (e.g., a mobile phone) associated with a user, for example, Kadji Bell, a manger of XYZ department store and is on the current shift. The user device may be in communication with a messaging application server which may be implemented with the automated message recipient identification system (hereinafter "system") to operate the messaging application. The system may allow Kadji to send a message using one or more dynamic tags that characterize the recipients for the message, which may eliminate a need for Kadji to know the identity of the message recipients prior to sending the message. For example, when Kadji needs to send a message to sales associates of XYZ department store, he may not need to find out who are working as sale associates in XYZ department store and then open a chatroom and invite all the sales associates to the chat room. Instead, Kadji may create and send a message 110 that includes a "Sales Associates" tag 112 which characterizes the recipients of the message 110.

To determine the recipients characterized by the tag, the system may internally store one or more of member or employee data sets of different types (e.g., directory data, personnel data, schedule data, location data, etc.), or receive one or more member data sets from one or more external data source devices (e.g., a directory server, personnel data server, member schedule data server, member location server, etc.). The system may connect to a new external data source device or disconnect from an existing data source device in a flexible manner. For example, when a new data source device becomes available, the system may connect to the new data source device to subscribe a new type of member data set. When an existing data source device malfunctions or cannot provide accurate or up-to-date member data, the system may disconnect from the data source device.

The system may be configured to aggregate a member data set from an external data source device. For example, upon connecting to a member directory server, the system may receive the current member directory data from the member directory server. The received member directory data may be stored in an internal or external data storage. When there is a change or update to the member directory data (e.g., new hire, promotion, retirement, resignation, etc.), the directory server would be one of the first things to be updated in an organization. The directory server may then send such update to the system, which may in turn update the stored member directory data. By aggregating member data from various data source devices, the system may be able to more promptly and accurately identify message recipients without needing to collect member data from members or management personnel (e.g., a member directory management personnel). This may also eliminate a need to operate two different data management systems for the same data type. For example, by connecting and subscribing to the member directory server and aggregating the member directory data from the member directory server, the system may be not required to separately collect, manage and update the member directory data, which is carried out by the member directory server. Also, the system may receive update data from the member directory server immediately after the member directory server is updated with new data, which may solve the technical problem of inaccurately identifying message recipients based on outdated and inaccurate member directory data when the member directory server provides an update periodically, for example, once a week or month.

Referring to FIG. 1, upon receiving the message 110 including the tag 112, the system may determine whether the tag is relevant to a specific data set or type, such as, member (or employee) directory data, member personnel data, member schedule data, member location data, etc. Once the relevant data set or type is determined, the system may search, in the data storage, a member data set corresponding to the relevant data type. For example, upon determining that that the "Sales Associates" tag 112 is an employee title, the system may determine that the tag 112 is relevant to the employee directory data, which may include, for example, an employee name, employee ID, department, title, role, assignment, supervisor, etc. The system may then search the employee directory data aggregated in the data storage and identify employees that are relevant to the "Sales Associates" tag 112. The system may then retrieve, from the data storage, the employee IDs, network login IDs or messaging app alias, etc. that the system can understand and translate to the target recipients for the message 110.

Alternatively, the system may send, to the employee directory server, a request to search and identify employees that match the "Sales Associates" tag 112. The employee directory server, which may operate independently from the system, may then search its database and sends identity data of the target recipients. For example, the employee directory server may send the employee IDs, network login IDs or messaging app alias, etc. that the system can understand and translate to the target recipients for the message 110.

The system may internally collect, manage and update various member data to operate independently without relying on an external data source device. For example, the system may communicate with user devices to request and receive geolocations (e.g., GPS coordinates) of the user devices. The system may also communicate with user devices to request and receive various member data (e.g., a name, title, department, team, supervisor, office location, etc.) from each user. The received member data may be stored in a data storage and managed using a database. An operator or administrator may then create a plurality of tags to utilize the stored member data. For example, an operator may remotely access the system using his or her computer. After reviewing available member data, such as a title, department, team, office location, etc., the operator may create a plurality of tags, such as, associate, manager, executive, intern, sales, marketing, security, human resource, inventory management, transportation, main lobby, first floor, second floor, etc.

Upon receiving the identity data of the target recipients from the external data source device, the system may send the message 110 to the target recipients, for example, the employees whose title is registered as "sales associates" in the employee directory server. The system may then receive responses, such as responses 120 and 130 from the sales associates, for example, Sara Dunn and Babak Shammas, and relay the received responses 120 and 130 to Kadji's user device. As such, by using the tag 112 characterizing the recipients, Kadji may send the message 110 without needing to know or search who the sales associates are and what their messaging app alias are, which may enhance and speed up the communication among the employees.

The system may be configured to allow the users to use more than one tag to characterize target recipients. For example, the system may receive a message 140 from Bruno Zhao, the CEO of XYZ department store. The message 140 may include two tags: a "Manager" tag 142 and "On-Shift" tag 144. The system may then determine one or more member data sets relevant to the tags 142 and 144. For example, the "Manger" tag 142 may be relevant to the directory data (e.g., employee directory data) aggregated and stored in the data storage, but the "On-Shift" tag 144 may not be relevant to the directory data. Instead, the "On-Shift" tag 144 may be relevant to member schedule data, such as employee shift data. The employee shift data may include a shift type (e.g., a morning shift, even shift, weekend shift, etc.), shift members, shift team manager, etc. The shift management server may operate in connection with an employee schedule server, which allows a member to add, move or delete a meeting, appointment, due date, shift data, etc. to a member's digital calendar. The system may receive an update from the shift management server when there is a change or update to the employee shift data managed by the shift management server. Alternatively, the system may send a request to the employee directory server for identity data of the employees relevant to the "Manger" tag 142. The system may also send another request to the shift management server for identity data of the employees relevant to the "On-Shift" tag 144.

The tags may be dynamic in a sense that the target recipients relevant to the tags may be different at different times or locations. For example, when there are two shift teams for day and night shifts, the target recipients relevant to the "On-Shift" tag 144 for a message sent during the day shift is completely different from the target recipients for a message sent during the night shift. Similarly, when the XYZ department store operates in two different locations, the target recipients relevant to the "On-Shift" tag 144 at one location may be completely different from the target recipient at the other location.

Upon searching the data storage or sending requests to external data source devices, the system may obtain identity data about all the mangers of XYZ department store and all the employees who are on the current shift. The system may then determine an employee or employees found in the both identity data pieces as the target message recipients. For example, Kadji, who is the manager and is on the current shift, would be found in both identity data pieces received from the employee directory server and shift management server. Hence, the system may determine Kadji as one of the target recipients, if not the only, for the message 140 sent by Bruno. The system may then send the message 140 to Kadji's user device and, in return, receive Kadji's response massage 150, which is then relayed to Bruno's user device. As such, when two or more tags are associated with a message, the system may be able to more accurately determine the recipients for the message. Also, by connecting or subscribing to more external data source devices, the system may allow to use more tags to characterize recipients in a more detailed and accurate manner.

The system may connect or subscribe to a new external data source device by arranging the new external data source device to initially send the current member data to the system and then send an update when there is a change or update to the member data managed by the external data source device. Alternatively, the system may connect or subscribe to a new external data source device by granting an access a data storage or database operated by the data source or allowing the system to send a database search inquiry to the data source. For example, the system may be configured to send an inquiry to the employee directory server when a tag indicating a title, department, office location, etc. The employee directory server may be configured to recognize and authorize the inquiry from the system based on an IP address or security credential (e.g., access ID and password) of the system.

The system may also temporarily or permanently disconnect from or stop subscribing to a external data source device when it is determined that the particular external data source device is malfunctioning. For example, the system may receive a feedback from those who have received messages that they are not the intended recipient for the message. The system may then track from which external data source device the target recipient data has originated. When it is determined that an external data source device has provided inaccurate target recipient data, the system may disconnect from the data source device by stop receiving an update or stop sending a request to identify target recipients for a message.

The system may be configured to provide additional tag-related services. For example, the system may be configured to automatically apply one or more tags to members based on various member data received from the external data source devices. Alternatively, the system may be configured to allow an authorized person to associate one or more tags to each member. FIG. 2 shows an implementation of a graphical user interface for configuring the system, from which various configuration setting may be adjusted, such as who can add tags (e.g., owners only, everyone, etc.), which types of member data can be used as a tag (e.g., a title, company, office, city, state, country and department), which external data source devices the member data can be received from to generate and apply tags (e.g., a member directory server, personnel data server, shift management server, etc.), etc. By adjusting the settings, the system may operate to, for example, generate tags based only on the title and department of the members, or create time-related tags based on the data received from the shift management server, which may host a shift app.

The system may be configured to provide data related to a tag. For example, referring to FIG. 1, when Kadji enters a word or words, such as a "Sales Associates" tag 162 and "On-Shift" tag 164, the system may determine whether the entered word or words are relevant to the available member data types, and determine identity data of the message recipients from each relevant data types aggregated and stored in the data storage. The system may then provide an indication as to whether the tag or tags are available for selection by Kadji. For example, the system may cause Kadji's device to change the appearance of the tags 162 and 164, such as adding an underline or changing a font color of the tag, to indicate that the tags 162 and 164 entered by Kadji are available for selection and usable for characterizing the message 160. The system may convert the tags to a linked text (e.g., a hypertext, etc.), which is linked to another graphical user interface or data page displaying a list of the recipients corresponding to the tags 162 and 164. The system may also provide data related to the target recipients of the tags 162 and 164. For example, as shown in FIG. 1, the system may cause Kadji's device to display a system message 166 indicating a number of the target recipients for the tags 162 and 164 as shown in FIG. 1, or a list of the target recipients.

Figure 3:
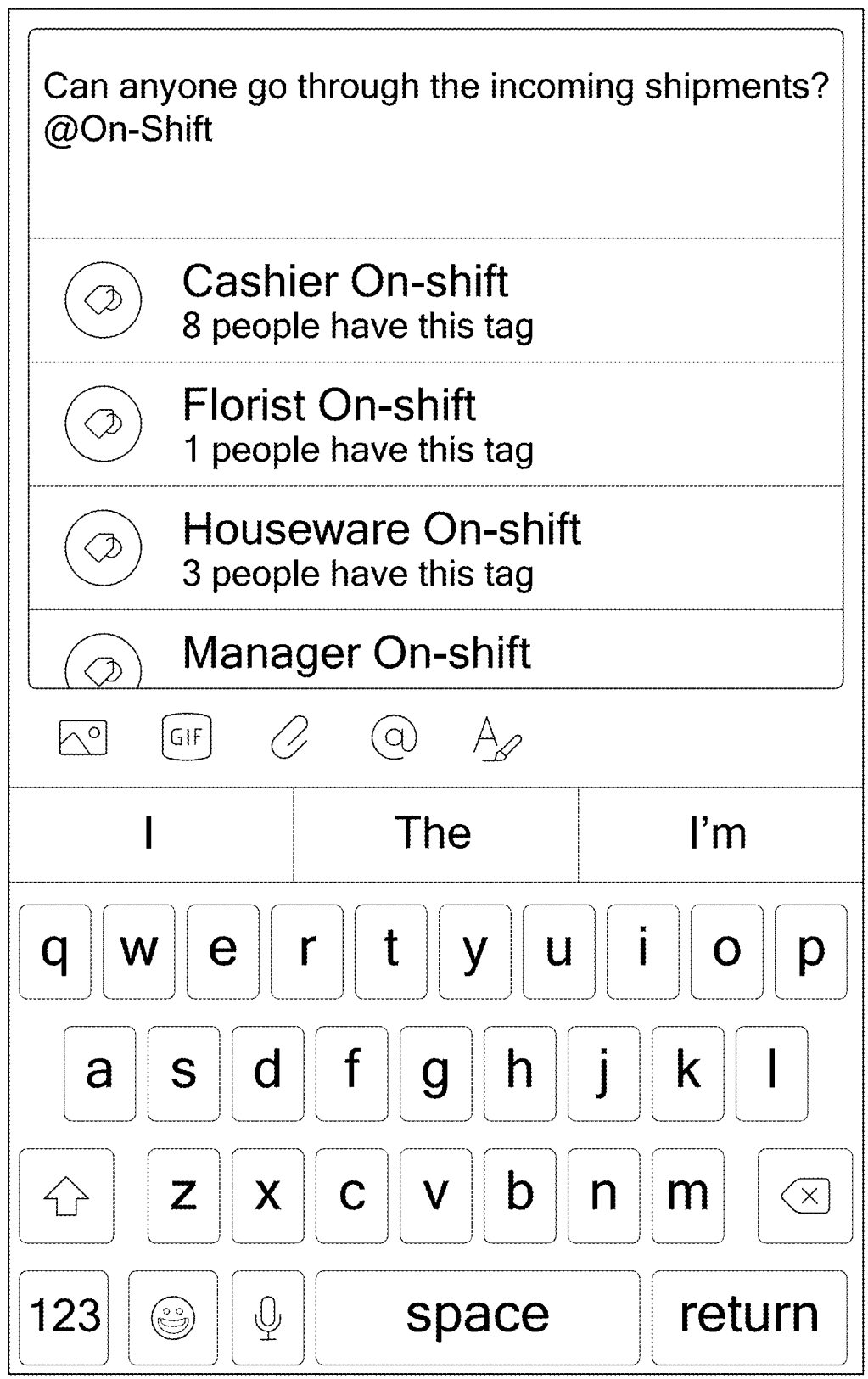
FIG. 3 illustrates an implementation of a user interface for a messaging app for displaying a list of tags relevant to a tag entered by a user.

The system may be configured to automatically complete or help a user find a tag when a user enters a letters, number or symbol. For example, the system may store, in a data storage, a number of tags that are relevant to the external data source devices available to the system. When Kadji enters a letter "s," the system may search the data storage to identify tags that starts with the letter "s," such as, Sales Department, Sales Manager, Sales Associates, Sales Director, Summer Intern, Safety Officer, etc. The system may then cause Kadji's device to display the identified tags for selection by Kadji. Another example is shown in FIG. 3, which illustrates a graphical user interface for a mobile messaging app operating in connection with the system. When the user enters a message and add a tag "@On-Shift," the user device may send the tag to the system, which may, in turn, generate and send, to the user device, a list of tags containing "On-Shift," such as, "Cashier On-Shift," "Florist On-Shift," "Houseware On-Shift," "Manager On-Shift," etc. The received list of tags may be displayed via the user interface for selection by the user.

Figure 4A:
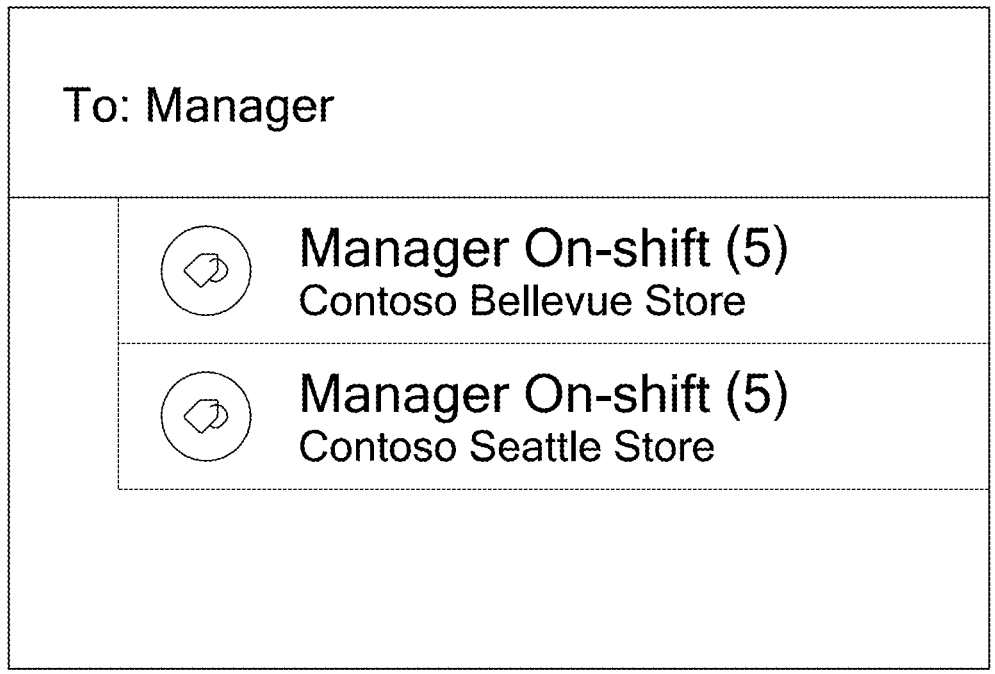
FIGS. 4A to 4D illustrate an implementation of a user interface to convert a user input to a tag and translating the tag to member contact data.
Figure 4B:
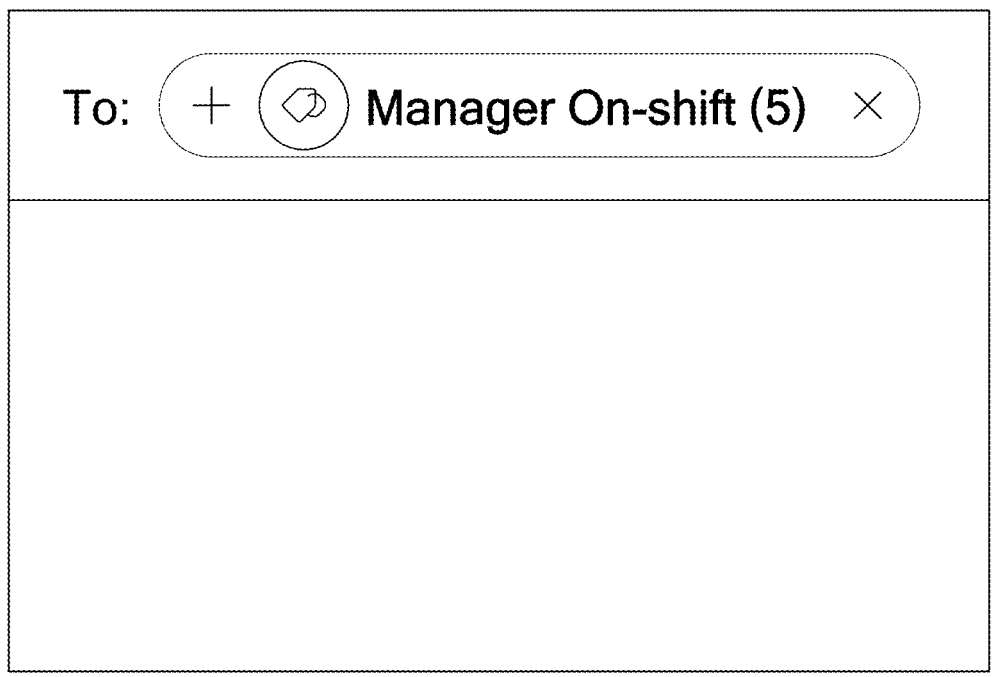
Figure 4C:
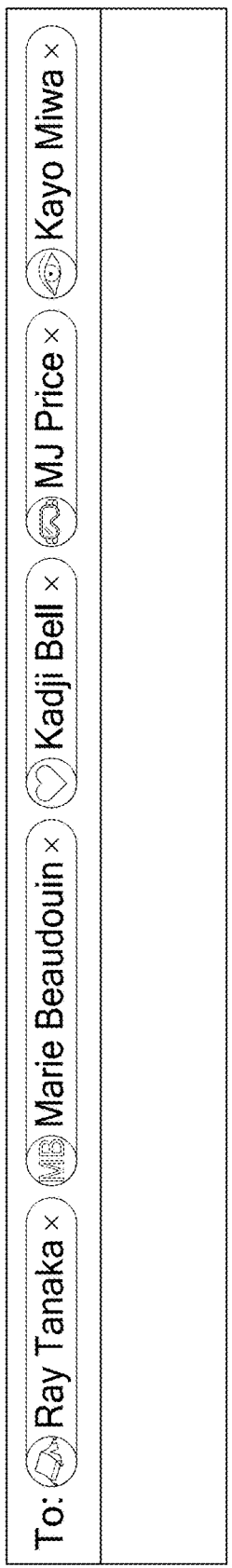
Figure 4D:
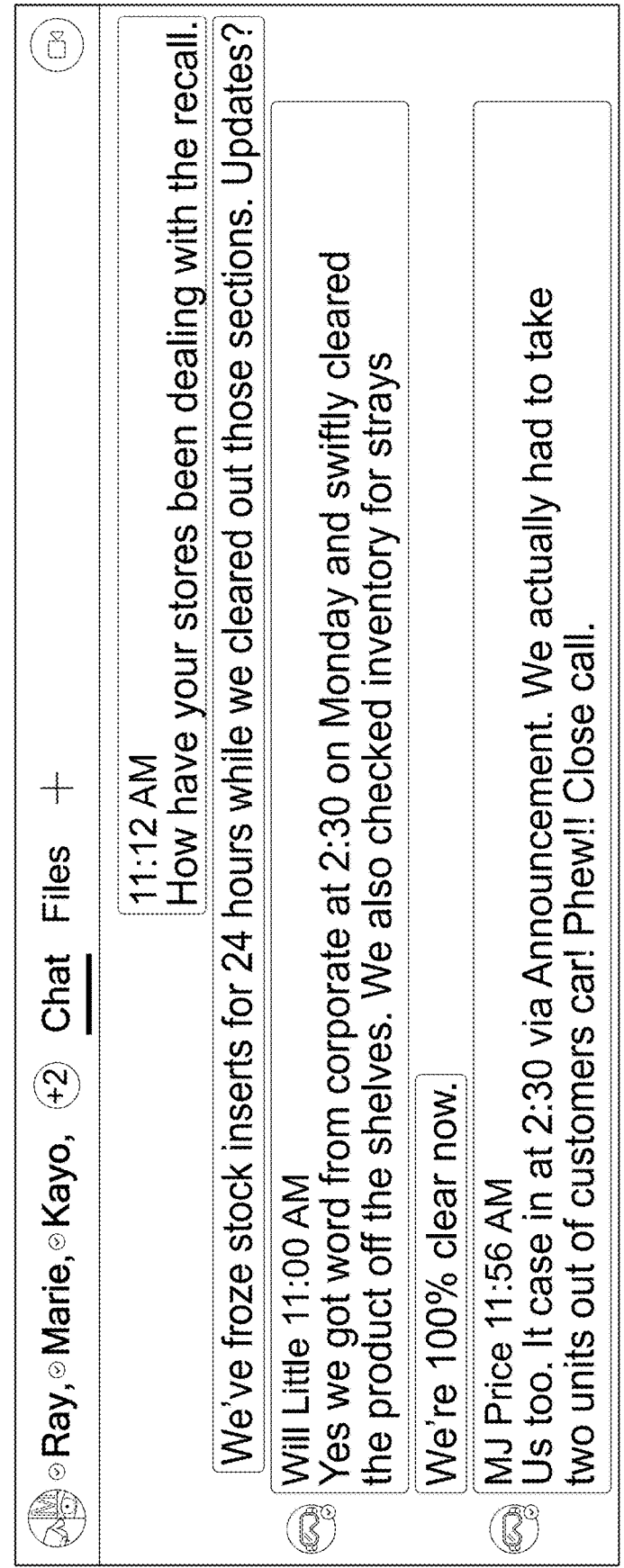

FIGS. 4A to 4D illustrate an implementation of how a word entered by a user is recognized as a tag by the system, and then translated to the actual members. In FIG. 4A, the user enters a word "Manager" in a search window of the messaging app. Upon receiving the word, the system may provide a list of available tags (e.g., Manger On-Shift at Bellevue Store and Manger On-Shift at Seattle Store) that are relevant to the entered word. When one of the list tags is selected by the user, the messaging application may ask the user to confirm whether the user wishes to start a messaging session with the users associated with the selected tag, which is shown in FIG. 4B. Upon receiving the confirmation, the system may transform the tag to the actual contact data that are used to invite the members associated with the tag to the messaging session. The system may also provide an avatar and name of each member associated with the selected tag, which may be displayed via the messaging app, as shown in FIG. 4C. Then, as shown in FIG. 4D, the members are invited to the messaging session. As such, the system may be able to transform a tag to member contact data, which may eliminate the process of searching and selecting members to invite the members to a messaging session.

The system may be configured to pre-generate one or more tags for each member when relevant member data becomes available or automatically update one or more tags associated with a member when an update is received from an external data source device. For example, as shown in FIG. 5, the system may generate one or more tags for each employee based on the employee directory data. The system may operate a data base, which may be stored in the data storage, to store the generated tag or tags associated with each member. Since each member is already associated with one or more tags, the system may be able to identify target recipients more quickly. The system may be configured to update one or more tags associated with each when an update is received from one or more external data source devices. For example, when an update indicating a personnel change between the shifts is received from the shift management server, the system may automatically update a shift related tag to reflect the updated shift data.

Figure 6:
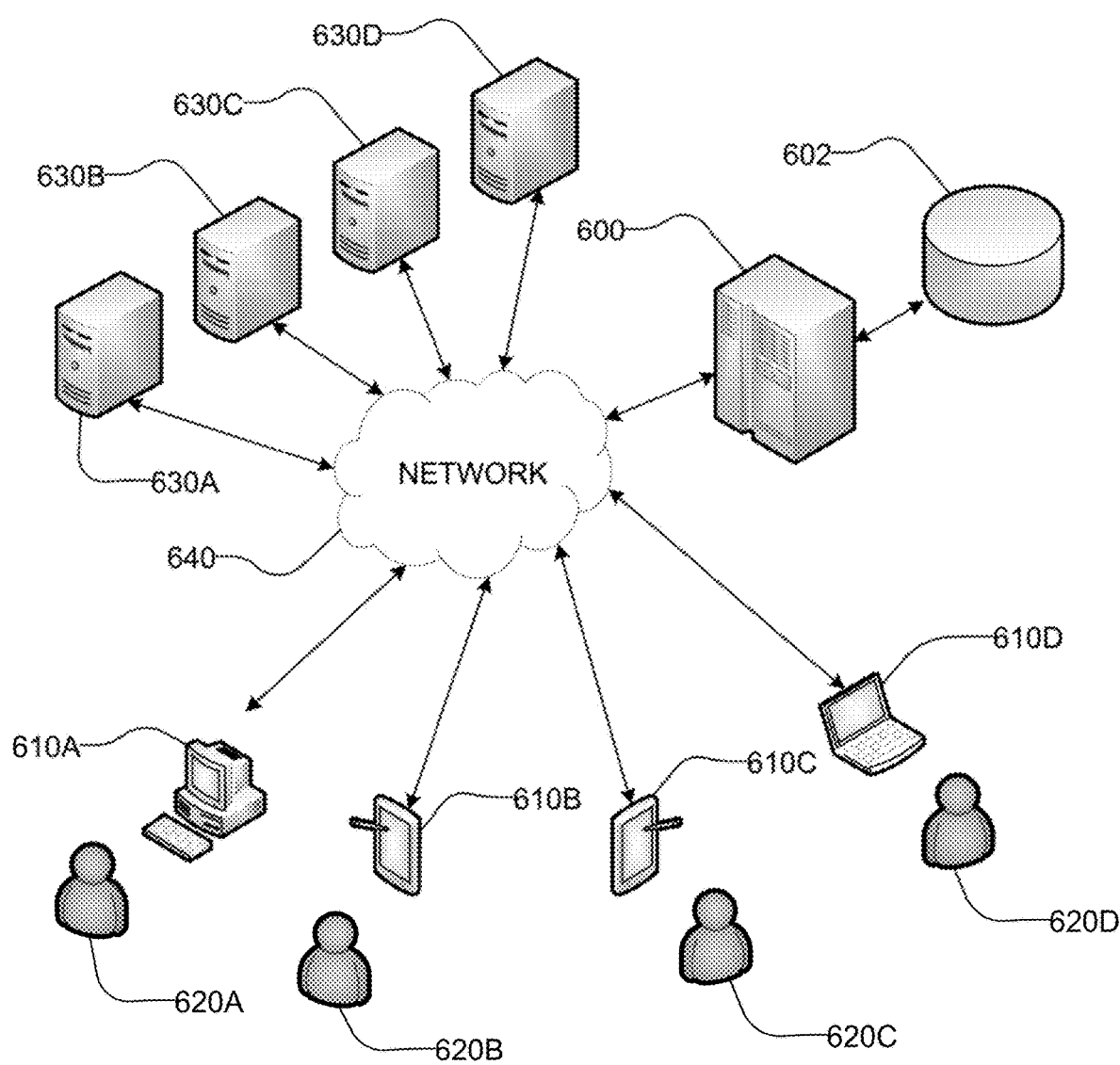
FIG. 6 illustrates the automated message recipient identification system connected to a plurality of user devices and data source devices via a network.

FIG. 6 illustrates an implementation of an automated message recipient identification system 600 (hereinafter referred to as "system 600") connected to a plurality of user devices 610A, 610B, 610C and 610D (referred to as "user devices 610" hereinafter) and a plurality of external data source devices 630A, 630B, 630C and 630D (referred to as "sources 630" or "source devices 630" hereinafter) via a network 640. The system 600 may include a computing device with communication capabilities. For example, the system 600 may be a server hosting a messaging service (e.g., messaging server) and implementing automated message recipient identification scheme to identify recipients for messages sent by organization members, communication service subscribers, government officials, etc. The system 600 may include or has access to a data storage 602, which may store various types of member data received and aggregated from one or more sources, a plurality of tags that are relevant to the member data handled by the sources 630, etc. The user devices 610A, 610B, 610C and 610D may be associated with a plurality of users 620A, 620B, 620C and 620D (referred to as "users 620" hereinafter), respectively. The user devices 610 may be any stationary or mobile computing device with communication capabilities. The users 620 may be members of an organization. Alternatively, the users 620 may not be a member of the same organization. For example, the user 620A may be a potential customer who wants to send a message to a marketing personnel of a company. The user devices 610 may operate a messaging app for the messaging service hosted by the messaging service server 600. The users 620 may use the messaging app to send or receive messages with other users. An implementation of a user interface for the messaging app is shown in FIG. 1.

The sources 630 may provide different types of member data. For example, the sources 630A, 630B, 630C and 630D may provide member directory data, member personnel data, member schedule data, member location data, respectively. Each source 630 may include a computing device operating a database to manage specific data and having communication capabilities. For example, the sources 630A, 630B, 630C and 630D may be a directory server, personnel data server, member schedule server and member location server, respectively. The directory server 630A may collect, store and update general member data, such as a username, title, department, team, supervisor, phone number, email address, office location, etc. The personnel data server 630B may collect, store and update more specific member data, such as, a member's specialty, training records, experiences, prior assignments, language capabilities, licenses, achievements, connections, etc. The member schedule server 630C may collect, store and update a member's shift, vacations, appointments, meetings, attendance/absence status, etc. The member location server 630D may be in communication with the user devices 610 to receive current geographical locations of the users 620 and configured to provide location data of the users 620 when requested by the server 600. The accurate member location data may be crucial in an emergency situation, such as, a fire or shooting breaks out and the nearby members need to be informed.

By connecting or subscribing to the sources 630, the server 600 may be able to receive an update from the sources when there is a change or update to the member data collected and managed by each source 630. By connecting or subscribing to various sources, more dynamic tags can be used to more accurately characterize the target recipients for a message. The server 600 may be operated to internally manage some or all of the source data. For example, the server 600 may manage the directory data while relying on the member location server 630D for current locations of the members. When a new data source device become available, the server 600 may connect to the new service to subscribe a new data set from the new data source device. When an existing source cannot provide accurate and up-to-date member data set, the server 600 would incorrectly identify a recipient group for a message and the message may be sent to a member who is not an intended recipient for the message. When this occurs, the server 600 may receive a feedback from a message recipient that the message is not tended for him or her. When a rate of the message being sent to wrong recipients reaches a predetermined threshold, it may be assumed that the source cannot provide accurate and up-to-date member data set. The server 600 may then unsubscribe from the data source by disconnecting form the data source and deleting the data set received from the data source such that the particular data set is no longer used to identify message recipients.

Figure 7:
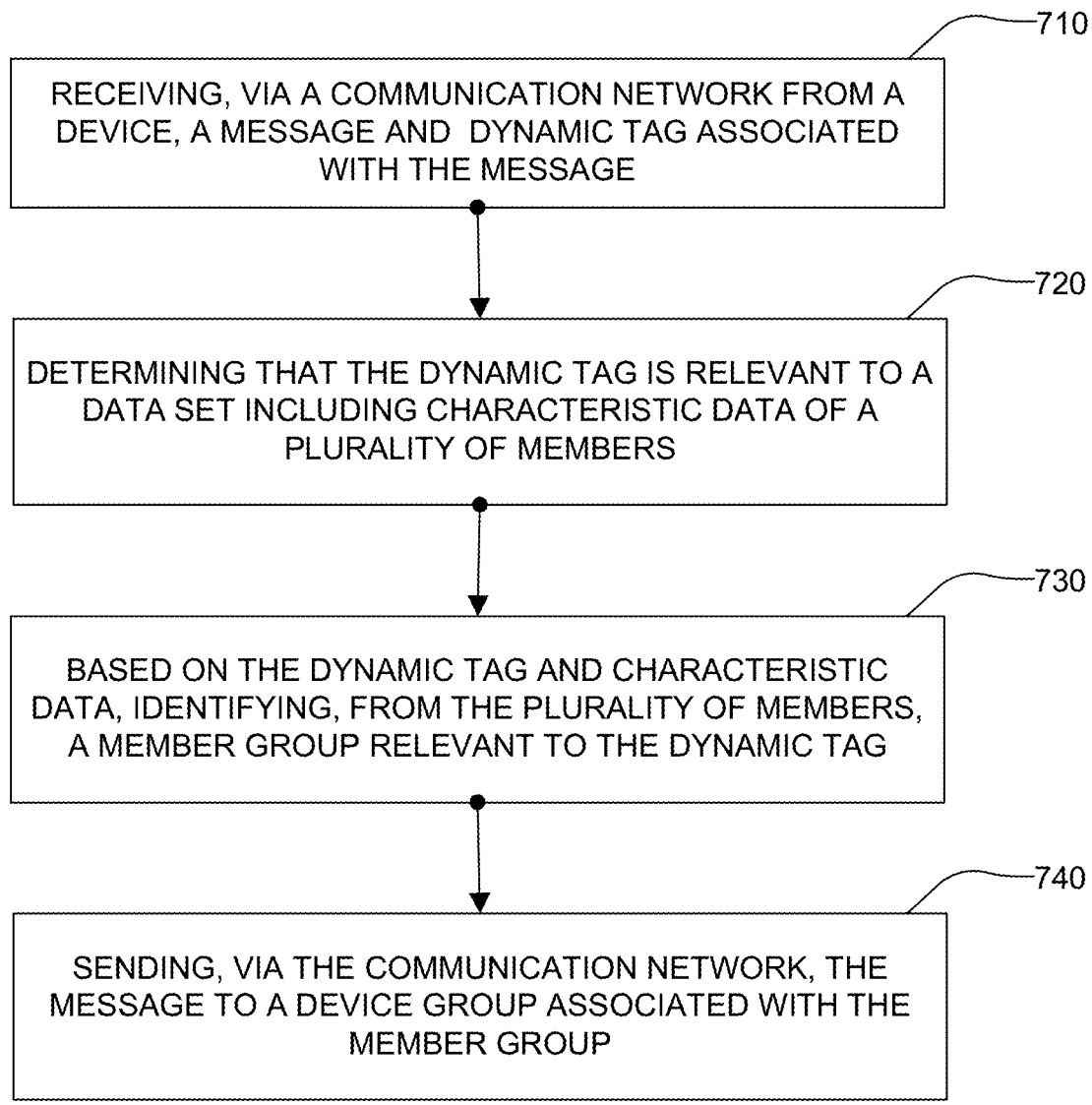
FIG. 7 illustrates a flow diagram showing an implementation of a method of operating the automated message recipient identification system.

FIG. 7 illustrates a flow diagram showing an implementation of a method of operating an automated message recipient identification system. The method is described below with reference to various elements shown in FIG. 6. At step 710, the system or server 600 may receive, via the communication network 640 from the first user device 610A, a message and a dynamic tag associated with the message. The dynamic tag may characterize a target recipient group for the message. For example, the server 600 may receive the message 110 shown in FIG. 1, which includes the "Sales Associates" tag 112, which characterizes to whom the message 110 should be sent. The server 600 may receive a message that is associated with two or more tags, such as, the message 140 associated with two tags 142 and 144, as shown in FIG. 1.

At step 720, the server 600 may determine that the receive dynamic tag is relevant to a data set including characteristic data of a plurality of members. For example, the server 600 may store or have access to a plurality of data sets of different types, such as, directory data, personnel data, schedule data and location data. Upon receiving the message 110 including the "Sales Associates" tag 112, the server 600 may search the data sets for the term "Sales Associate" and may find the term "Sales Associate" in a "Title" data field of the directory data, which indicates that the received tag 112 is relevant to the directory data. When more than one tag is associated with the message, the server 600 may determine the corresponding data set for each tag. For example, when the message 140 (shown in FIG. 1) is received, the server 600 may determine that the "Manager" tag 142 is relevant to the directory data, and the "On-Shift" tag 144 is relevant to the schedule data.

At step 730, the server 600 may, based on the dynamic tag and characteristic data, identify, from the plurality of members, a member group relevant to the dynamic tag. For example, when the message 110 associated with the "Sales Associates" tag 112 is received, the server 600 may search the directory data to identify the members who are characterized as "Sales Associate" in the "Title" data field. When the message 140 associated with the "Manager" tag 142 and "On-Shift" tag 144 is received, the server 600 may search the directory data and schedule data to identify a member group who are characterized as "manager" and another member group who are characterized as currently being on shift, respectively. The server 600 may then select the members who are included in both members groups as the recipient group for the message 140.

At step 740, the server 600 may send, via the communication network 640, the message to a device group associated with the member group. For example, upon identifying certain members (e.g., Sara Dunn and Babak Shammas in FIG. 1) as being the member group relevant to the message 110, the server 600 may identify contact data (e.g., network IDs, messaging app alias, mobile phone number, etc.) of the members of the recipient group. Then, the server 500 may then send, via the communication network 640, the message 110 using the contact data, to user devices (e.g., PC, smartphone, mobile phone, etc.) associated with the members of the recipient group.

As such, by using a dynamic tag, a message may be sent out even when a message sender does not know the identity or exact contact information of the recipient of the message because the system can take care of the process of identifying the recipients for the message based on the dynamic tag. The system may be operated to connect or subscribe to data sets of different types in a flexible manner, which may allow the sender to use more dynamic tags to characterize the recipient in a more detailed manner. Hence, the system may reduce or eliminate the technical problem that a message sender needs to know the identity or contact information of the message recipients before sending the message.

The automated message recipient identification system may be used for other purposes, for example, public announcement, survey/census, emergency contact, project management, etc. For example, when a fire breaks out, a local or federal government may receive, from cellular service providers, identity and location data of the mobile service subscribers whose current locations are determined to be close to the fire. The government may then send a warning message or alert to those who are near to the fire.

This description is also directed to controlling, using one or more dynamic tags, access to a resource, such as, a space (e.g., a location or room) with an entry control system, data stored in an access-controlled data storage, hardware/equipment (e.g., a computer, printer, scanner, etc.) that requires a user's credential to activate or operate, software/application (e.g., an operating system, mobile app, software update/upgrade, software patch) that requires a privilege to access, operate, modify or install.

The dynamic tags may be used to characterize those who are subject to an access control setting or command. For example, a user (e.g., a security personnel) may send, using her or his PC or mobile phone, an access control setting with respect to an access-controlled resource and one or more dynamic tags that characters members who are to be subject to the access control setting. For example, using a communication device (e.g., a mobile phone), a user (e.g., a security personnel) may send, to an access control system, an access control setting (e.g., "unlock room 233") and one or more dynamic tags (e.g., "manager" and "on-shift) to allow the manager who is on the current shift can enter room 233. Also, an IT personnel may send another access control commend (e.g., "install XYZ app") and another dynamic tag ("executives") to install a mobile management app to mobile devices associated with the executives.

The access control setting and associated dynamic tags may be received by an access control system, which may in turn identify, based on the received dynamic tags and one or more member data sets, the member group and carry out the access control task specified by the received access control setting. Hence, the user (e.g., a security personnel or IT personnel) may no longer need to identify each member who is subject to the access control task and manually perform the access control task on each identified member. Hence, the user may be able to instantly perform an access control task as soon as a need arises.

Figure 8:
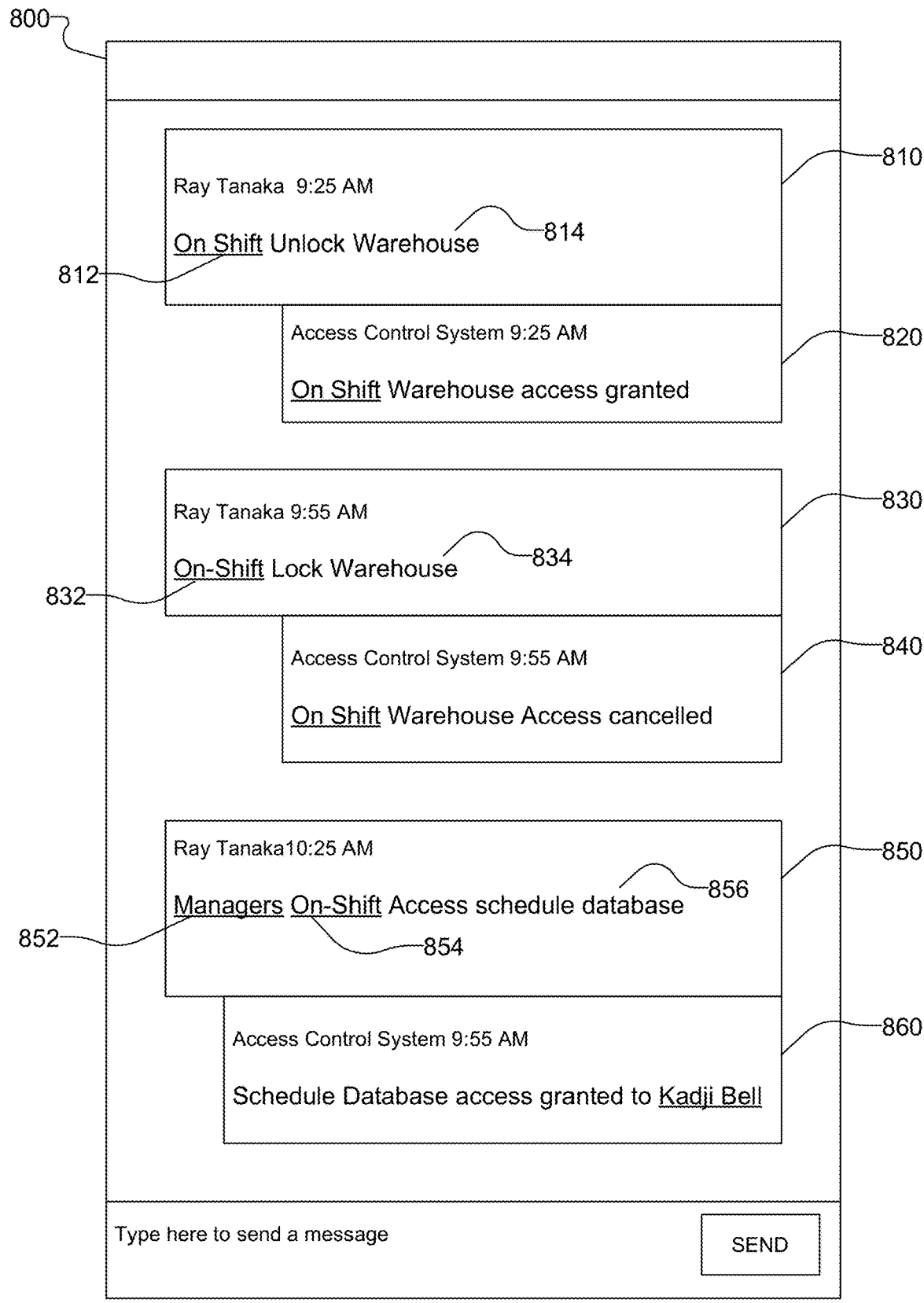
FIG. 8 illustrates an implementation of a user interface for a security management app in communication with an access control system.

FIG. 8 illustrates an implementation of a GUI 800 for an access control app, which may operate in communication with an access control system. For example, referring to FIG. 6, the system 600 may operate as the access control server. The access control app may be installed and operating in a user device, such as the mobile phone 610B, which is in communication with the server 600 via the communication network 640. The mobile phone 610B may be associated with the user 620B, who may be a security personnel having a privilege to control access of the members to an access-control resource, such as, a space, data, hardware or software. The server 600 may be in communication with one or more member data source devices 630 via the communication network 640. The server 600 may connect and subscribe to the data source devices 630 in a flexible manner such that a new data source device 630 may be connected to the server 600 and a malfunctioning data source device 630 may be disconnected from the server 600. The server 600 may aggregate the data sets by receiving an update to the data set from each data source device and modifying the data set based on the received update such that the server 600 may have access to accurate and up-to-date data sets.

Referring to FIG. 8, there may be a situation where a certain member or member group needs to access a secured location which is normally not accessible without an appropriate security clearance. For example, a warehouse storing valuable goods may be normally accessible only by those with an appropriate access privilege. When a decision is made to assign the members on the current shift with a task of moving the goods stored in the warehouse to another location, the user 620B may send, to the server 600, a message 810, which include an "On Shift" dynamic tag 812, and a "Unlock Warehouse" access control setting 814. The dynamic tag 812 may characterize a member or member group who are subject to the access control setting 814. The access control setting 814 may specify a particular access-controlled resource and an action or operation involving the specified resource. For example, in the "Unlock Warehouse" access control setting 814, the "Warehouse" specifies the access control resource, and "Unlock" specifies the action or operation involving the "Warehouse." The user 620B may not need to type to specify the particular access-controlled resource or action/operation. The system 600 may present a user interface on a PC or mobile device to provide various access-controlled resources and various actions/operations for selection by the user 620. Alternatively, the system 600 may be implemented as a stand-alone entry control system physically located to an access-controlled resource (e.g., a room), which may be equipped with a user interface (e.g., a keyboard or touch pad) for receiving a user input or wirelessly connected to a user device.

Upon receiving the message 810 from the mobile phone 610B, the server 600 may search the various data sets, such as, member directory data, member personnel data, member schedule data, member location data, etc., to determine to which data set the "On Shift" dynamic tag 812 is relevant. The member schedule data may include a member schedule attribute corresponding to the dynamic tag 812. For example, the member schedule data may include member shift attribute or member attendance/absence attribute of each member, which may correspond to the "On-Shift" dynamic tag 812. The member shift attribute may include one or more parameters, such as a shift team ID (e.g., Shift Team A), shift start time (e.g., 7:00 AM), shift end time (e.g., 5:00 PM), etc. associated with each member. Upon finding that the member schedule data includes the attribute corresponding to the dynamic tag 812, the shift-related attributes, the server 600 may determine that the tag 812 is relevant to the member schedule data.

The server 600 may then access the member schedule data source (e.g., the member schedule server 630C) that stores the member schedule data. The member schedule data may include a member attribute associated with each member (e.g., a member shift attribute). Each member attribute may include one or more parameters related to a time or time period (e.g., a shift team, shift start time, shift end time, etc.). For example, the shift team parameter attribute may indicate a particular shift team to which a member belongs and shift working hours for the particular shift team. The server 600 may then map the dynamic tag 812 to the member schedule data based on the parameters associated with each member and a time or time period associated with the "On-Shift" dynamic tag 812. The "On-Shift" dynamic tag 812 may be associated with a current time at which the message 810 was sent or the mapping is performed. A "On-Shift at tomorrow 2 PM" tag may be associated with a further time (e.g., tomorrow 2 PM). A "On-Vacation Next Month" tag may be associated with a period of time (e.g., next month). By performing the mapping, the server 600 may identify one or more mapped members that form the member group subject to the access control setting. For example, based on the "On Shift" dynamic tag 812 and the shift-related parameter of each member, the server 600 may identify the members who are on the current shift.

The time or time period associated with the "On Shift" dynamic tag 812 may vary depending on, for example, when the message 810 was sent or the mapping was performed. Hence, the mapped members based on the same "On Shift" dynamic tag 812 may vary depending on the time or time period associated with the dynamic tag 812. For example, the "On-Shift" dynamic tag 812 used before and after a shift change may result in two totally different member groups, respectively.

Upon identifying the member group, the server 600 may grant, based on the "Unlock Warehouse" access control setting 814, the members of the member group access to the warehouse. Upon completing the access control task, the system 600 may generate and send, to the user device 610B, a response message 820 indicating that an access to the warehouse has been granted to the "On Shift" members.

When the moving is completed and the "On-Shift" members no longer need to access the warehouse, the user 620B may send another message 830, which includes an "On-Shift" dynamic tag 832 and a "Lock Warehouse" access control setting 834, to cancel the access to the warehouse, which was previously granted to the "On Shift" members. Upon receiving the message 830, the server 600 may determine a member or member group that is on the current shift, and then control the entry control system of the warehouse to cancel the access to the warehouse granted to the "On Shift" members. The server 600 may then send, to the mobile phone 610B, a message 840 to indicate that the access control setting 834 has been successfully executed on the "On Shift" members.

The user 620B may use two or more dynamic tags to characterize the member or members who are to be subject to an access control setting. For example, the user 620B may send a message 850, which includes two dynamic tags: a "Managers" tag 852 and a "On-Shift" tag 854, and an access control setting 856, such as "Access schedule database," as shown in FIG. 8 Upon receiving the two dynamic tags 852 and 854, the server 600 may determine to which member data set each dynamic tag is relevant. For example, the server 600 may search the directory data, in which some of the members are characterized as "manager" in a "Title" attribute field. The server 600 may then determine that the tag 852 is relevant to the directory data. The server 600 may also search the schedule data, which includes each member's shift-related attributes, and then determine that the tag 854 is relevant to the schedule data. The server 600 may then determine, based on the "Managers" tag 852 and the title attribute in the directory data, a member group relevant to the "Managers" tag 852. Similarly, the server 600 may determine, based on the "On-Shift" tag 854 and the shift-related attributes in the schedule data, a member group relevant to the "On-Shift" tag 854. The server 600 may compare the members on the two members groups and identify one or more members (e.g., Kadji Bell) who are included in both the member groups as being subject to the access control setting 856. The server 600 may then grant Kadji Bell an access to the schedule database such Kadji Bell may read or update schedule-related data stored in the schedule database. The server 600 may also send a message 860 to the user device 610B to indicate that Kadji Bell is granted with an access to the schedule database.

As such, by allowing a user to use one or more dynamic tags, the user may carry out an access control task without needing to know which member or member group needs to be subject to the access control setting. Hence, the user can quickly and immediately take an access control-related action.

Figure 9:
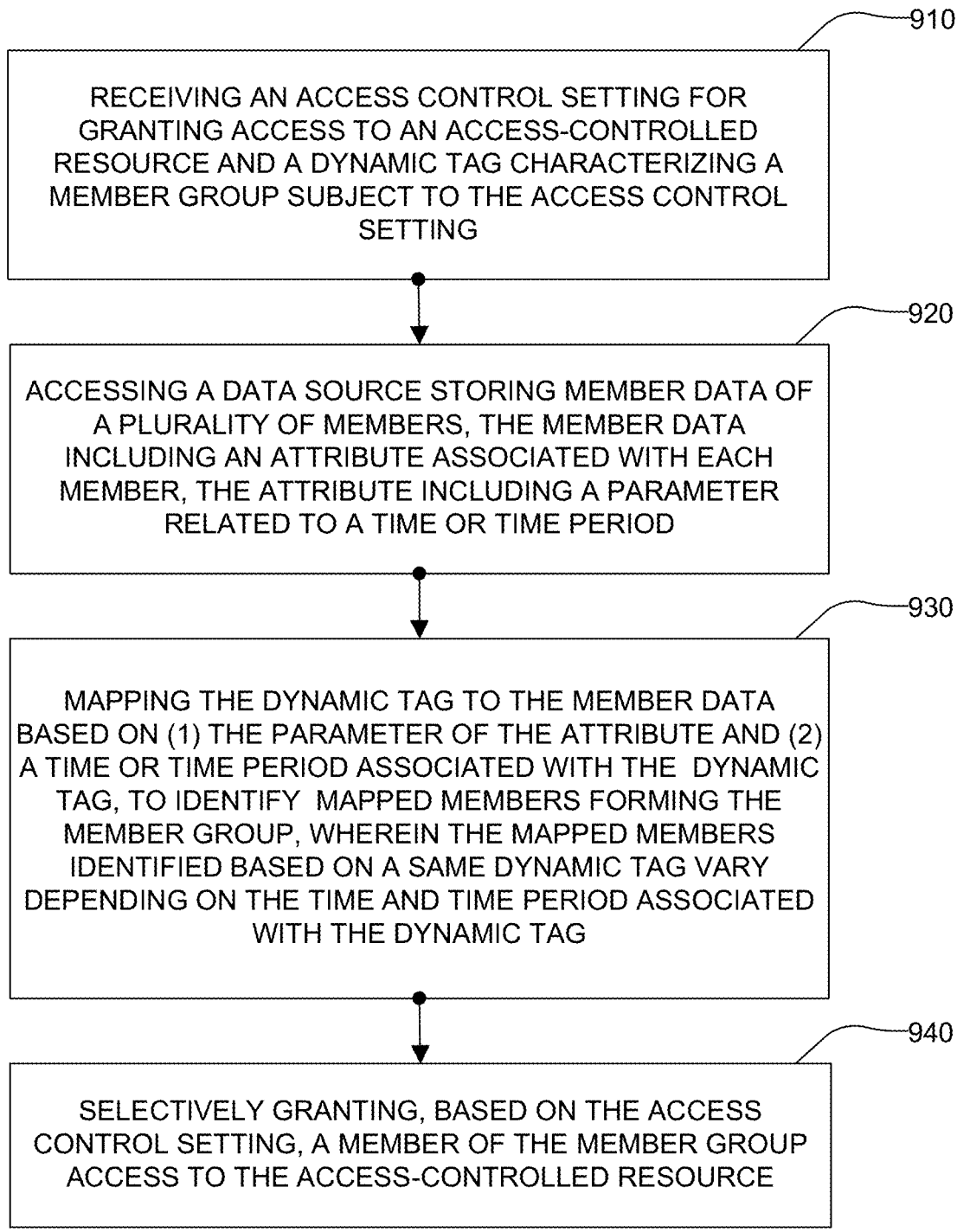
FIG. 9 illustrates a flow diagram showing an implementation of a method of operating the access control system.

FIG. 9 is a flow diagram showing an implementation of a method of operating an access control system which may automatically identify, based on one or more dynamic tags, a member or member group that is to be subject to an access control setting. The method may be performed by any computing device, for example, the server 600 shown in FIG. 6.

At step 910, the server 600 may receive an access control setting for granting access to an access-controlled resource and a dynamic tag characterizing a member group subject to the access control setting. For example, the server 600 may receive, via the communication network from a user device (e.g., mobile phone 610B), an access control setting (e.g., the "Unlock Warehouse" setting 814) and a dynamic tag (e.g., the "On Shift" dynamic tag 812) characterizing a member or member group to be subject to the access control setting 814. The "On Shift" tag 812 may indicate one or more members who are on the current shift. The "Unlock Warehouse" access control setting 814 may indicate an access-controlled resource (e.g., the warehouse) and an access control task (e.g., unlock or granting access) that is to be performed on the access-controlled resource.

At step 920, the server 600 may access a data source (e.g., the member schedule server 630C) storing member data (e.g., member schedule data) of a plurality of members. The member data may include an attribute (e.g., a member shift attribute) associated with each member, and the attribute may include a parameter related to a time or time period (e.g., a shift team or hour, shift start time, shift end time, etc.). For example, the shift team parameter attribute may indicate a particular shift team to which a member belongs and shift working hours for the particular shift team.

At step 930, the server 600 may map the dynamic tag 812 to the member schedule data based on (1) the parameters associated with each member and (2) a time or time period associated with the "On-Shift" dynamic tag 812, to identify mapped members forming the member group. For example, the server 600 may map the "On-Shift" dynamic tag 812 to the member scheduled data based on the shift team or hour parameters associated with each member and a current time associated with the "On-Shift" dynamic tag 812. The time or time period associated with the "On Shift" dynamic tag 812 may vary depending on, for example, when the message 810 was sent or the mapping was performed. Hence, the mapped members based on the same "On Shift" dynamic tag 812 may vary depending on the time or time period associated with the dynamic tag 812. For example, the "On-Shift" dynamic tag 812 used before and after a shift change may result in two totally different member groups, respectively.

At step 940, the server 600 may selectively grant, based on the access control setting, a member of the member group access to the access-controlled resource. For example, upon identifying the member group at step 930, the server 600 may grant, based on the "Unlock Warehouse" access control setting 814, the members of the identified member group access to the warehouse.

As such, by allowing a user to use one or more dynamic tags, the server 600 may allow a user to initiate a security task even though he or she does not know the identity of the members to be subject to such task. Hence, the user may quickly and immediately perform a security task with very little or no delay, which may be critical for a successful task completion.

Figure 10:
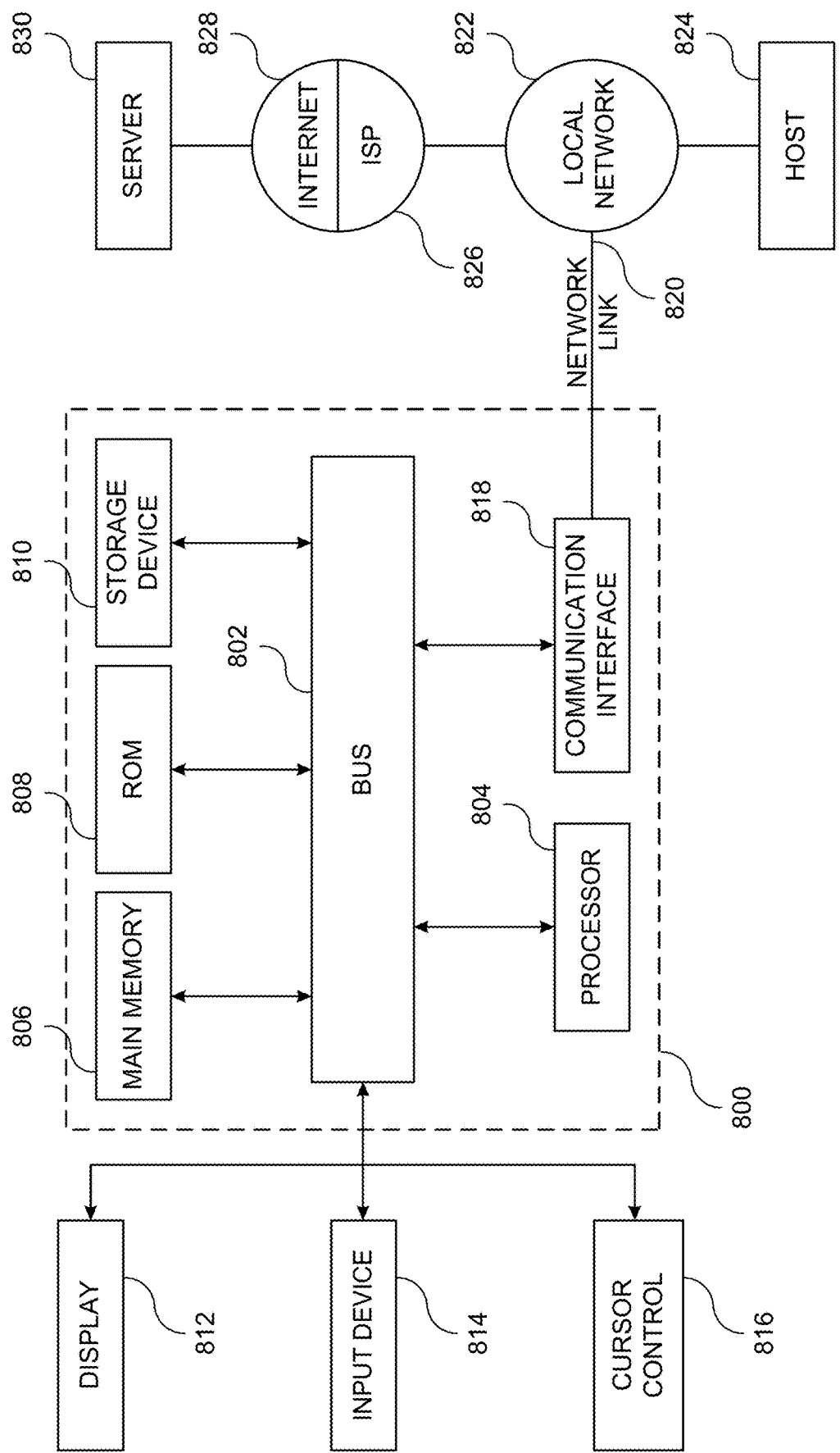
FIG. 10 is a block diagram showing an example computer system upon which aspects of this disclosure may be implemented.

FIG. 10 is a block diagram showing an example a computer system 1000 upon which aspects of this disclosure may be implemented. The computer system 1000 may include a bus 1002 or other communication mechanism for communicating information, and a processor 1004 coupled with the bus 1002 for processing information. The computer system 1000 may also include a main memory 1006, such as a random-access memory (RAM) or other dynamic storage device, coupled to the bus 1002 for storing information and instructions to be executed by the processor 1004. The main memory 1006 may also be used for storing temporary variables or other intermediate information during execution of instructions to be executed by the processor 1004. The computer system 1000 may implement, for example, the system 600, user devices 610 and source devices 630.

The computer system 1000 may further include a read only memory (ROM) 1008 or other non-transitory static storage device coupled to the bus 1002 for storing static information and instructions for the processor 1004. A storage device 1010, such as a flash or other non-volatile memory may be coupled to the bus 1002 for storing information and instructions.

The computer system 1000 may be coupled via the bus 1002 to a display 1012, such as a liquid crystal display (LCD), for displaying information. One or more user input devices, such as the example user input device 1014 may be coupled to the bus 1002, and may be configured for receiving various user inputs, such as user command selections and communicating these to the processor 1004, or to the main memory 1006. The user input device 1014 may include physical structure, or virtual implementation, or both, providing user input modes or options, for controlling, for example, a cursor, visible to a user through display 1012 or through other techniques, and such modes or operations may include, for example virtual mouse, trackball, or cursor direction keys.

The computer system 1000 may include respective resources of the processor 1004 executing, in an overlapping or interleaved manner, respective program instructions. Instructions may be read into the main memory 1006 from another machine-readable medium, such as the storage device 1010. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1010. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1000 may also include a communication interface 1018 coupled to the bus 1002, for two-way data communication coupling to a network link 1020 connected to a local network 1022. The network link 1020 may provide data communication through one or more networks to other data devices. For example, the network link 1020 may provide a connection through the local network 1022 to a host computer 1024 or to data equipment operated by an Internet Service Provider (ISP) 1026 to access through the Internet 1028 a server 1030, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the following, further features, characteristics and advantages of the invention will be described by means of items:

Item 1. A device comprising: a processor; and a memory in communication with the processor, the memory comprising executable instructions that, when executed by the processor, cause the processor to control the device to perform functions of: receiving a first access control setting for granting access to an access-controlled resource and a first dynamic tag characterizing a first member group subject to the first access control setting; accessing a first data source storing first member data of a plurality of members, the first member data including a first attribute associated with each member, the first attribute comprising a parameter related to a time or time period; mapping the received first dynamic tag to the first member data based on (1) the parameter of the first attribute and (2) a time or time period associated with the first dynamic tag, to identify first mapped members forming the first member group, wherein the first mapped members identified based on a same dynamic tag vary depending on the time or time period associated with the first dynamic tag; and selectively granting, based on the first access control setting, a member of the first member group access to the access-controlled resource.

Item 2. The device of item 1, wherein the access-controlled resource comprises a space, data, hardware or software.

Item 3. The device of item 1 or 2, wherein the first data source comprises a member schedule data source.

Item 4. The device of any one of the preceding items, wherein the first attribute comprises a member shift attribute or member attendance/absence attribute.

Item 5. The device of any one of the preceding items, wherein the parameter of the first attribute comprises a member shift schedule.

Item 6. The device of any one of the preceding items, wherein, to map the first dynamic tag to the first member data, the instructions, when executed by the processor, cause the processor to control the device to perform a function of: comparing a time of the mapping with the time or time period associated with the parameter of the first attribute associated with each member; or comparing a time or time period specified in the first access control setting with the time or time period associated with the parameter of the first attribute associated with each member.

Item 7. The device of any one of the preceding items, wherein the instructions, when executed by the processor, further cause the processor to control the device to perform functions of: after selectively granting the member of the first group access to the access-controlled resource, receiving a second access control setting for granting access to the access-controlled resource and the first dynamic tag and a second dynamic tag, the first and second dynamic tags characterizing a second member group subject to the second access control setting; accessing the first data source; mapping the received first dynamic tag to the first member data of the first data source to identify second mapped members; accessing a second data source storing second member data of the plurality of members, the second member data including a second attribute of each member; mapping the received second dynamic tag to the second member data based on a parameter of the second attribute, to identify third mapped members; and selectively granting, based on the second access control setting, a member of the second member group access to the access-controlled resource, the second member group comprising a member included in both the second and third mapped members.

Item 8. The device of any one of the preceding items, wherein the first mapped members are different from the second mapped members.

Item 9. The device of any one of the preceding items, wherein the second data source comprises a member directory data source, member personnel data source, member schedule data source or member location data source.

Item 10. The device of any one of the preceding items, wherein the second attribute comprises a title, department, team, office location, attendance/absence status, shift schedule or geographical location of each member.

Item 11. A method of operating a device, comprising: receiving a first access control setting for granting access to an access-controlled resource and a first dynamic tag characterizing a first member group subject to the first access control setting; accessing a first data source storing first member data of a plurality of members, the first member data including a first attribute associated with each member, the first attribute comprising a parameter related to a time or time period; mapping the received first dynamic tag to the first member data based on (1) the parameter of the first attribute and (2) a time or time period associated with the first dynamic tag, to identify first mapped members forming the first member group, wherein the first mapped members identified based on a same dynamic tag vary depending on the time or time period associated with the first dynamic tag; and selectively granting, based on the first access control setting, a member of the first member group access to the access-controlled resource.

Item 12. The method of item 11, wherein the access-controlled resource comprises a space, data, hardware or software.

Item 13. The method of item 11 or 12, wherein the first data source comprises a member schedule data source.

Item 14. The method of any one of the preceding items, wherein the first attribute comprises a member shift attribute or member attendance/absence attribute.

Item 15. The method of any one of the preceding items, wherein the parameter of the first attribute comprises a member shift schedule.

Item 16. The method of any one of the preceding items, Wherein mapping the first dynamic tag to the first member data comprises: comparing a time of the mapping with the time or time period associated with the parameter of the first attribute associated with each member; or comparing a time or time period specified in the first access control setting with the time or time period associated with the parameter of the first attribute associated with each member.

Item 17. The method of any one of the preceding items, further comprising: after selectively granting the member of the first group access to the access-controlled resource, receiving a second access control setting for granting access to the access-controlled resource and the first dynamic tag and a second dynamic tag, the first and second dynamic tags characterizing a second member group subject to the second access control setting; accessing the first data source; mapping the received first dynamic tag to the first member data stored in the first data source to identify second mapped members; accessing a second data source storing second member data of the plurality of members, the second member data including a second attribute of each member; mapping the received second dynamic tag to the second member data based on a parameter of the second attribute, to identify third mapped members; and selectively granting, based on the second access control setting, a member of the second member group access to the access-controlled resource, the second member group comprising a member included in both the second and third mapped members.

Item 18. The method of any one of the preceding items, wherein the first mapped members are different from the second mapped members.

Item 19. The method of any one of the preceding items, wherein the second data source comprises a member directory data source, member personnel data source, member schedule data source or member location data source.

Item 20. A non-transitory computer readable medium storing instruction that, when executed by a processor, cause a computer to perform functions of: receiving a first access control setting for granting access to an access-controlled resource and a first dynamic tag characterizing a first member group subject to the first access control setting; accessing a first data source storing first member data of a plurality of members, the first member data including a first attribute associated with each member, the first attribute comprising a parameter related to a time or time period; mapping the received first dynamic tag to the first member data based on (1) the parameter of the first attribute and (2) a time or time period associated with the first dynamic tag, to identify first mapped members forming the first member group, wherein the first mapped members identified based on a same dynamic tag vary depending on the time or time period associated with the first dynamic tag; and selectively granting; based on the first access control setting, a member of the first member group access to the access-controlled resource.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
a processor; and
a memory in communication with the processor, the memory comprising executable instructions that, when executed by the processor, cause the processor to control the device to perform functions of:
receiving, from a user device via a communication network, a user command including (1) a first access control setting for granting access to an access-controlled resource located remotely from the user device and (2) a first dynamic tag containing first context related to a member attribute and second context related to a time or time period;
in response to receiving the user command, accessing a first data source storing first member data of a plurality of members, the first member data including a first attribute associated with each member, the first attribute comprising a first parameter related to an attribute of each member and a second parameter related to a time or time period associated with each member;
mapping the received first dynamic tag to the first member data based on (1) a comparison between the first context of the first dynamic tag and the first parameter of the first attribute associated with each member and (2) a comparison between the second context of the first dynamic tag and the second parameter of the first attribute associated with each member, to identify one or more first mapped members forming a first member group, wherein the one or more first mapped members identified based on the first context of the first dynamic tag varies depending on the time or time period of the second context of the first dynamic tag; and
selectively granting, based on the first access control setting, a member of the first member group access to the access-controlled resource.

2. The device of claim 1, wherein the access-controlled resource comprises a space, data, hardware or software.

3. The device of claim 1, wherein the first data source comprises a member schedule data source.

4. The device of claim 3, wherein the first parameter of the first attribute comprises a title, department, team, office location or geographical location of each member.

5. The device of claim 4, wherein the second parameter of the first attribute comprises a member shift schedule.

6. The device of claim 1, wherein, to map the first dynamic tag to the first member data, the instructions, when executed by the processor, cause the processor to control the device to perform a function of:
comparing a time of the mapping with the time or time period associated with the second parameter of the first attribute associated with each member; or
comparing the time or time period associated with the second context of the first dynamic tag with the time or time period associated with the second parameter of the first attribute associated with each member.

7. The device of claim 1, wherein the instructions, when executed by the processor, further cause the processor to control the device to perform functions of:
after selectively granting the member of the first group access to the access-controlled resource, receiving a second access control setting for granting access to the access-controlled resource and the first dynamic tag and a second dynamic tag, the first and second dynamic tags characterizing a second member group subject to the second access control setting;
accessing the first data source;
mapping the received first dynamic tag to the first member data of the first data source to identify second mapped members;

accessing a second data source storing second member data of the plurality of members, the second member data including a second attribute of each member;

mapping the received second dynamic tag to the second member data based on a parameter of the second attribute, to identify third mapped members; and selectively granting, based on the second access control setting, a member of the second member group access to the access-controlled resource, the second member group comprising a member included in both the second and third mapped members.

8. The device of claim 7, wherein the one or more first mapped members are different from the second mapped members.

9. The device of claim 7, wherein the second data source comprises a member directory data source, member personnel data source, member schedule data source or member location data source.

10. The device of claim 7, wherein the second attribute comprises a title, department, team, office location, attendance/absence status, shift schedule or geographical location of each member.

11. A method of operating a system for controlling access to a resource, comprising:

receiving, from a user device via a communication network, a user command including (1) a first access control setting for granting access to an access-controlled resource located remotely from the user device and (2) a first dynamic tag containing first context related to a member attribute and second context related to a time or time period;

in response to receiving the user command, accessing a first data source storing first member data of a plurality of members, the first member data including a first attribute associated with each member, the first attribute comprising a first parameter related to an attribute of each member and a second parameter related to a time or time period;

mapping the received first dynamic tag to the first member data based on (1) a comparison between the first context of the first dynamic tag and the first parameter of the first attribute associated with each member and (2) a comparison between the second context of the first dynamic tag and the second parameter of the first attribute associated with each member, to identify one or more first mapped members forming a first member group, wherein the one or more first mapped members identified based on the first context of the first dynamic tag varies depending on the time or time period of the second context of the first dynamic tag; and selectively granting, based on the first access control setting, a member of the first member group access to the access-controlled resource.

12. The method of claim 11, wherein the access-controlled resource comprises a space, data, hardware or software.

13. The method of claim 11, wherein the first data source comprises a member schedule data source.

14. The method of claim 13, wherein the first parameter of the first attribute comprises a title, department, team, office location or geographical location of each member.

15. The method of claim 14, wherein the second parameter of the first attribute comprises a member shift schedule.

16. The method of claim 11, wherein mapping the first dynamic tag to the first member data comprises:

comparing a time of the mapping with the time or time period associated with the parameter of the first attribute associated with each member; or comparing the time or time period associated with the second context of the first dynamic tag with the time or time period associated with the second parameter of the first attribute associated with each member.

17. The method of claim 11, further comprising:

after selectively granting the member of the first group access to the access-controlled resource, receiving a second access control setting for granting access to the access-controlled resource and the first dynamic tag and a second dynamic tag, the first and second dynamic tags characterizing a second member group subject to the second access control setting;

accessing the first data source;

mapping the received first dynamic tag to the first member data stored in the first data source to identify second mapped members;

accessing a second data source storing second member data of the plurality of members, the second member data including a second attribute of each member;

mapping the received second dynamic tag to the second member data based on a parameter of the second attribute, to identify third mapped members; and selectively granting, based on the second access control setting, a member of the second member group access to the access-controlled resource, the second member group comprising a member included in both the second and third mapped members.

18. The method of claim 17, wherein the one or more first mapped members are different from the second mapped members.

19. The method of claim 17, wherein the second data source comprises a member directory data source, member personnel data source, member schedule data source or member location data source.

20. A non-transitory computer readable medium storing instruction that, when executed by a processor, cause a computer to perform functions of:

receiving, from a user device via a communication network, a user command including (1) an access control setting for granting access to an access-controlled resource and (2) a dynamic tag containing first context related to a member attribute and second context related to a time or time period;

in response to receiving the user command, accessing a data source storing member data of a plurality of members, the member data including an attribute associated with each member, the attribute comprising a first parameter related to an attribute of each member and a second parameter related to a time or time period;

mapping the received dynamic tag to the member data based on (1) a comparison between the first context of the dynamic tag and the first parameter of the attribute associated with each member and (2) a comparison between the second context of the dynamic tag and the second parameter of the attribute associated with each member, to identify one or more mapped members forming a member group, wherein the one or more mapped members identified based on the first context of the first dynamic tag varies depending on the time or time period of the second context of the first dynamic tag; and selectively granting, based on the access control setting, a member of the member group access to the access-controlled resource.

\* \* \* \* \*